United States Patent Office 2,766,532
Patented Oct. 16, 1956

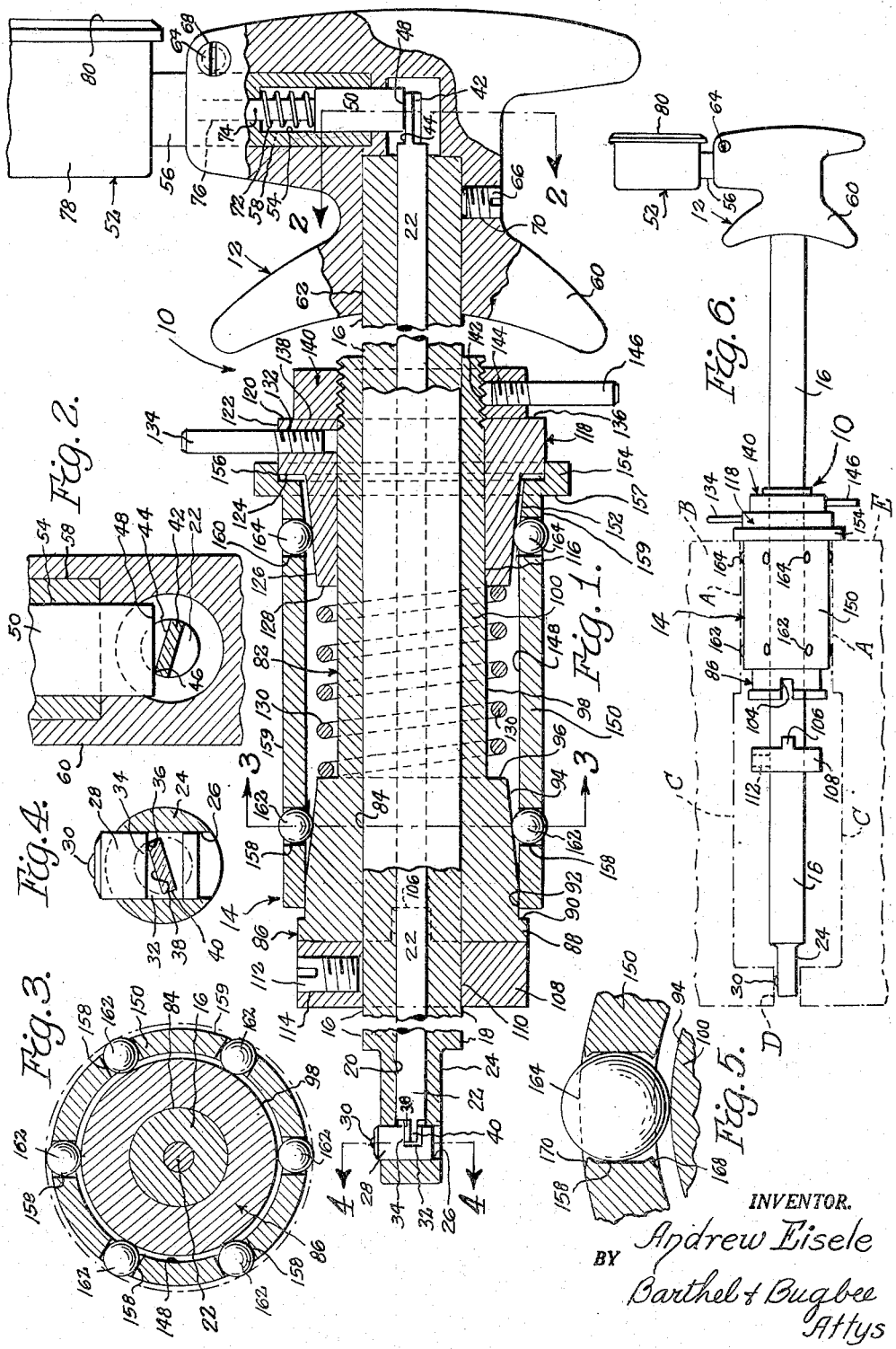

2,766,532

CENTERING BORE CONCENTRICITY GAUGE HOLDER

Andrew Eisele, Detroit, Mich.

Application September 20, 1954, Serial No. 457,221

3 Claims. (Cl. 33—174)

This invention relates to bore gauges and, in particular, to bore concentricity gauges.

One object of this invention is to provide an improved bore concentricity gauge and holder unit wherein the gauge stem is held accurately coaxial within a first or reference bore while it is used to explore and measure the concentricity and, if desired, the straightness of a second bore or bore to be gauged, regardless of whether the reference bore is accurately cylindrical, slightly tapered or slightly out of round.

Another object is to provide a bore concentricity gauge and holder unit of the foregoing character wherein the gauge holder is held in the reference bore by an expanding ball arrangement of such consrtuction that the bore-contacting balls are expanded equally in all directions into contact with the reference bore by adjusting mechanism within the holder, thereby positively yet accurately clamping the holder centrally within the reference bore while the stem of the bore gauge is rotatable and also axially slidable within the holder along an axis which is coincident with the axis of the reference bore.

Another object is to provide a bore concentricity gauge and holder unit of the foregoing character which is especially well adapted to the rapid yet accurate gauging of bores under mass production conditions at a low cost of such inspection, made possible by the rapid adjustment of the holder to successive reference bores which vary slightly in diameter, departure from cylindricity, as by being either slightly conical or tapered, or slightly out of round, yet within permissible manufacturing variations or tolerances.

Another object is to provide a bore concentricity gauge and holder unit of the foregoing character wherein the holder is so constructed as to be not only rapidly clamped concentrically within the reference bore but also rapidly unclamped from engagement with that bore, thereby enabling the checking of successive bores-to-be-gauged with both rapidity and accuracy.

Other objects and advantages of the invention will become apparent during the course of the following description of the accompanying drawings, wherein:

Figure 1 is a central vertical section, partly in side elevation, through a bore concentricity gauge and holder unit, according to one form of the invention, with portions of the stem and motion-transmitting rod of the gauge omitted to conserve space;

Figure 2 is an enlarged fragmentary section taken along the line 2—2 in Figure 1, showing the motion-transmitting mechanism at the outer end of the gauge adjacent the dial indicator employed therewith;

Figure 3 is a cross-section taken along the line 3—3 in Figure 1, through one set of the clamping and centering balls;

Figure 4 is a section taken along the line 4—4 in Figure 1, through the inner end of the motion-transmitting rod and the movable measuring pin;

Figure 5 is an enlarged fragmentary view of one of the centering and clamping balls of Figure 1, with its mount and expanding cone, showing the means for retaining the ball within its mount; and Figure 6 is a side elevation, on a reduced scale, of the bore concentricity gauge and holder unit of Figure 1, mounted in position within a reference bore while checking the concentricity of a bore to be gauged.

Hitherto, the checking of the concentricity of a bore to be gauged relatively to a reference bore has been difficult to carry out under mass production conditions, such as, for example, in the mass production of automobile engines. Frequently, two intendedly coaxial bores are used in a machine being manufactured, for example, the longitudinally-spaced coaxial bores of different diameters in an internal combustion engine cylinder block which receive the distributor assembly and its drive shaft. As a result of variations in manufacture, these bores frequently are not only not coaxial but are occasionally not even cylindrical, either as regards their being out of round or tapered. When such conditions are super-imposed upon the variations in diameter which must be permitted, within allowable tolerances, in order to make mass production possible, the problem of quickly yet accurately gauging the concentricity or coaxiality of such bores has hitherto been a very serious and seemingly insurmountable problem.

The present invention solves the problem of rapid yet accurate measurement of the concentricity and straightness of a bore to be gauged relatively to a reference bore, even though the reference bore itself may be slightly out of round or slightly tapered or, if accurately cylindrical, slightly varying in diameter within the permissible manufacturing tolerances. The present invention provides a bore gauge holder which rotatably and slidably receives the elongated cylindrical stem of the bore gauge in a snug accurate fit while adjustably yet fixedly clamping itself in the reference bore in a position wherein the bore gauge stem is accurately coaxial with the reference bore, notwithstanding minor variations in the diameter or cylindricity of the reference bore. Moreover, the holder of the present invention is quickly clamped and unclamped or released, so that the minimum time is consumed in placing the instrument in position before gauging, and in removing the instrument from position after gauging, and transferring the instrument to the next bore for the next gauging operation.

Referring to the drawings in detail, Figure 1 shows a bore concentricity gauge and holder unit, generally designated 10, consisting generally of a bore gauge 12 mounted in a bore gauge holder 14. The bore gauge 12 itself is conventional, except for the construction of the stem thereof and the manner in which it is rotatably and slidably mounted within the holder 14, as described in more detail below, and consequently the details of the internal mechanism of the bore gauge 12 are beyond the scope of the present invention. For the purposes of the present invention, the bore gauge 12 has been shown with one type of motion-transmitting mechanism but other types may optionally be used, for example, those shown in the Eisele Patents 2,268,579 of January 6, 1942; 2,438,274 of March 23, 1948; 2,484,697 of October 11, 1949; 2,566,321 of September 4, 1951, or 2,581,473 of January 8, 1952.

Thus, the bore gauge 12 is mounted in an elongated hollow cylindrical stem 16 having an accurately cylindrical outer surface 18 and a bore 20 coaxial therewith and rotatably receiving a motion-transmitting rod 22. The stem 16 at its inner end is provided with a reduced diameter portion 24 containing a transverse bore 26 in which a movable measuring pin 28 is snugly yet reciprocably mounted. The pin 28 is preferably provided with a hardened spherical contact tip 30 of any suitable hard material for resisting wear such as, for example, a suitable gem stone such as a sapphire or diamond, or an insert of tungsten carbide or its equivalent. The movable measuring pin 28 is adapted to move into and out of its bore 26 in the reduced diameter stem portion 24, which is of only slightly less diameter than the diameter of the bore to be gauged, so that a fixed measuring pin or locating pins are either optional or unnecessary, depending upon the circumstances of gauging. Since the present instrument is primarily intended for mass production gauging of bores of substantially the same diameter, it is economically feasible to provide an end portion 24 of the single diameter to be gauged, because of the large number of bores of the same diameter, within manufacturing tolerances, to be gauged.

The movable measuring pin 28 is provided on one side thereof with a radial notch 32 having an accurately-flat machined side wall surface 34 on the side thereof nearest the contact tip 30. Engageable with the contact surface 34 (Figure 4) is the sharp edge 36 of a flattened end portion 38 formed on a chord of the circle comprising the circumference of the motion-transmitting rod 22 and constituting one side of a diametral end portion 40 of the rod 22. As a consequence, when the tip 30 engages a bore surface and pushes the measuring pin 28 into the transverse bore 26, this reciprocating motion is converted into rotary motion of the rod 22 by engagement of the notch surfaces 34 with the sharp edge 36 on the flat surface 38 of the diametral portion 40. The opposite end of the rod 22 is provided with a similar diametral portion 42 (Figure 2) having a similar flat surface 44 with a similar sharp edge 46 engageable with the accurately flat outer end 48 of the motion-transmitting plunger 50 of a conventional dial indicator, generally designated 52.

The plunger 50 is reciprocably mounted within a bore 54 in a tubular dial indicator stem 56 which is of cylindrical shape and seated in a cylindrical transverse socket 58 in a gauge handle 60 having a cylindrical longitudinal socket 62 snugly receiving the outer end of the bore gauge stem 16. Set screws 64 and 66 threaded into suitably threaded transverse bores 68 and 70 lock the dial indicator stem 56 and bore gauge stem 16 in their respective sockets 58 and 62. The dial indicator plunger 50 is forced downward by a helical compression spring 72 mounted within the dial indicator stem bore 54 and encircling the reduced diameter portion 74 of the dial indicator plunger 50, thereby tending to rotate the motion-transmitting rod 22 in a counterclockwise direction (Figure 2). The reduced diameter portion 74 of the dial indicator plunger 50 passes through a reduced diameter bore 76 therein into the interior of the casing 78 of the dial indicator 52, where it engages motion-multiplying mechanism by which the reciprocating motion of the plunger 50 is converted into rotary motion of the usual needle shaft and needle (not shown) with which the dial indicator 56 is equipped and which registers with a circumferential divided scale indicating the amount of motion of the measuring pin 28 in any suitable unit, such as ten-thousandths of an inch. The details of the dial indicator 52 are conventional and are outside the scope of the present invention, such dial indicators being available on the open market. In the present bore gauge 12, however, the casing 78 of the dial indicator 52 is arranged transversely to the axis of the bore gauge stem 68 so that its face 80 lies in a plane perpendicular to the axis of the motion-transmitting rod 22 in order to enable the inspector to read the dial indicator 52 most conveniently, as shown in Figure 6.

The holder 14 includes an inner sleeve 82 (Figure 1) having a central bore 84 therethrough snugly yet slidably and rotatably receiving the outer cylindrical surface 18 of the bore gauge stem 16. One end of the inner sleeve 82 is provided with an enlargement or fixed expanding cone 86 successively having a flange 88, an annular shoulder 90, a cylindrical surface 92, a conical or tapered surface 94, and an annular shoulder 96 by which it is separated from the outer surface 98 of the reduced diameter portion 100 of the sleeve 82. The fixed expanding core 86 at its outer end 102 is provided with an axial notch 104 (Figure 6) which receives a corresponding-shaped axial tongue 106 on a collar 108 having a bore 110 by which it is adjustably mounted on the outer surface 18 of the bore gauge stem 16. A set screw 112 mounted in a transverse bore 114 locks the collar 108 in any desired position, as described below in connection with the operation of the invention.

Slidably mounted on the outer surface 98 of the reduced diameter portion 100 of the inner sleeve 82 by means of a bore 116 therein is a hollow movable expanding cone 118 having successively an end arrangement 120 with a cylindrical surface 122, an annular shoulder 124, a tapered or conical surface 126 converging inward toward the conical surface 94, and an annular end shoulder 128 which serves as an abutment for one end of a helical compression spring 130, the opposite end of which engages the annular shoulder 96 on the inner sleeve 82. The movable expanding cone 118 is provided with a transverse threaded hole 132 into which is threaded one end of a radial handle or manipulating pin 134, so as to enable rapid insertion or removal of the pin 134 for rotating the movable expanding cone 118.

The movable expanding cone 118 has an end surface 136 engageable by the corresponding abutment surface 138 of an internally-threaded collar 140 which is threaded onto the externally-threaded end portion 142 of the reduced diameter portion 100 of the inner sleeve 82. Like the movable cone 118, the internally-threaded collar 140 is provided with a radial threaded hole 144 into which the threaded end of a manipulating pin or handle 146 is removably inserted.

Slidably mounted on the external cylindrical surface 92 of the fixed expanding cone 86 is the corresponding internal cylindrical surface 148 of a hollow outer sleeve 150. The opposite end of the outer sleeve 150 is provided with an internal conical or flared surface 152 leading into the internal cylindrical surface 148 and surrounded by an annular enlargement or flange 154 having an enlarged counterbore 156 slidably engaging the outer cylindrical surface 122 of the movable cone 118. The flange 154 has an annular shoulder 157 between it and the outer surface 159 of the outer sleeve 150. The outer sleeve 150 is provided with two axially-spaced sets of multiple radial holes 158 and 160, the axes of each set being accurately located in a single plane accurately perpendicular to the coincident axes of the cylindrical surfaces 148, 92, 84 and 20. Six such holes 158 or 160 are shown in each set (Figure 3) but a greater or lesser number may obviously be provided.

Slidably mounted in the holes 158 or 160 are two sets of accurately spherical precision balls 162 and 164 respectively enagageable with the conical surfaces 94 and 126 of the fixed and movable expanding cones 86 and 118 respectively. The balls 162 and 164 are of greater diameter than the thickness of the outer sleeve 150 between its inner cylindrical surface 148 and its outer cylindrical surface 159 so as to enable the balls 162 and 164 to be moved inward or outward by the cones 86 or 118 through their respective holes 158 and 160. The holes 158 and 160 are ground and lapped to snugly yet slidably receive the respective balls 162 or 164 which are of high precision bearing ball dimensions and material, such as hardened steel. In order to prevent escape of the balls 162 or 164 from their respective holes 158 or 160 (Figure 5), the opposite ends of the holes 158 and 160 are peened or otherwise constricted as at 168 and 170 respectively after the holes have been otherwise completed and the balls inserted.

In the operation of the invention, let it be assumed that intendedly coaxial bores A and D in a body B such as an internal combustion engine cylinder block, are to be checked by the bore concentricity gauge and holder unit 10 of the present invention, the bores A and D being interconnected by a non-precision relief bore C which is not be checked. To check the bore D for concentricity with the reference bore A, the user inserts the unit 10 through the bore A in the body B, so that the holder 14 comes to a halt (Figure 6) with the flange 154 against the surface of the body B surrounding the reference bore A. It is of course assumed that the fixed and movable ball-expanding cones 86 and 118 have been moved apart sufficiently far from one another to permit the balls 162 and 164 to move into their respective holes 158 and 160 a sufficient distance to permit the easy insertion of the outer sleeve 150 into a reference bore A of the minimum diameter permitted by the manufcaturing tolerances.

With the gauge and holder unit 10 inserted in the reference bore A in the above manner, and with the reduced diameter portion 24 and measuring pin 28 of the bore gauge 12 temporarily located within the relief bore C, the inspector while holding the handle 134 with one hand swings the handle 146 by the other hand to rotate the internally-threaded collar 140 relatively to the movable ball-expanding cone 118 along the threaded end portion 142 of the inner sleeve 82. This causes the movable cone 118 to move along the reduced diameter portion 100 of the inner sleeve 82 toward the fixed cone 86 thereon, causing the oppositely-tapered conical surfaces 94 and 126 to move toward one another. This action forces the two sets of balls 162 and 164 radially outward in their radial holes 158 and 160 respectively, causing them to tightly and firmly engage the surface of the reference bore A. Since the balls 162 and 164 move outward by equal increments for equal relative approaches of the cones 86 and 118 toward one another, the balls 162 and 164 simultaneously center and clamp the holder 14 within the reference bore A, regardless of whether or not the bore A is exactly cylindrical or slightly tapered. The bore 84 and the bore gauge stem 16 mounted therein are now located accurately concentric or coaxial with the reference bore A.

To check the bore D for concentricity with the reference bore A and also, if desired, for straightness, the inspector, by grasping the handle 60 now pushes the stem 16 inward so that the reduced diameter portion 24 and the measuring tip 30 of the measuring pin 28 pass into the bore D to be measured. As the contact tip 30 reaches the bore D, the needle of the dial indicator gauge 52 remains at zero if the bore D is accurately concentric with the reference bore A while the bore gauge 12 is rotated a complete revolution, so that the contact tip 30 of the measuring pin 28 explores the entire circumference of the bore D. If, however, there is a departure from concentricity, the needle of the dial indicator 52 will move during such rotation, thereby indicating the extent of such departure. If, on the other hand, as the inspector pushes the reduced diameter portion 24 and contact tip 30 of the measuring pin 28 straight into the bore D to be measured, if the latter is straight, the needle will remain motionless during such push. If however, the bore D is tilted relatively to the reference bore A, the needle of the dial indicator 52 will move as the contact tip 30 travels from one end of the bore D to the other, the extent of swing of the needle indicating the amount of tilt as well as any departure from straightness of the bore D.

To facilitate loosening of the holder 14 within the reference bore A after a measurement has been made, the inspector grasps the bore gauge handle 60 and pulls the bore gauge stem 16 outward, at the same time rotating it until he feels the tongue 106 of the collar 108 engage the end of the fixed cone 86 and enter the notch 104 therein, thereby locking the stem 16 momentarily to the inner sleeve 82. He now rotates the stem 16, thereby simultaneously rotating the inner sleeve 82 and fixed cone 86 thereof relatively to the balls 162 and 164, causing the latter to release their grip thereon. At the same time, the sleeve 82 rotates relatively to the movable cone 118, so that the balls 162 and 164 move radially inward in their respective holes 158 and 160 so as to release their grip upon the reference bore A. The inspector meanwhile releases the clamping pressure on the movable cone 118 relatively to the fixed cone 86 by moving the handles 134 and 146 relatively to one another to rotate the threaded collar 140, through a reversal of the procedure described above for clamping the holder 14 in the reference bore A.

While the centering gauge holder 14 of the present invention has been described and claimed in connection with its use for holding bore concentricity gauges, it will be understood that the invention includes its use with gauges of other types, such as plug gauges, which may be inserted and held in the bore or passageway 84. It will also be understood that the holder 14 itself may be used for checking the bore in which it is inserted.

What I claim is:

1. An expanding centering holder for centering the stem of a bore concentricity gauge in a reference bore while checking the concentricity of a related bore, comprising a tubular member having a central passageway snugly but slidably and rotatably receiving the gauge stem, a bore-contacting-element support disposed outwardly of said tubular member and having multiple outwardly-directed bore-contacting-element guideways disposed in circumferentially-spaced relationship therein, multiple bore-contacting elements mounted in said guideways for motion outwardly from said tubular member, a bore-contacting-element expander mounted on said tubular member in engagement with said bore-contacting elements and having means therein responsive to the axial shifting of said expander and elements relatively to one another for moving said elements outwardly into engagement with said reference bore, means for shifting said expander and elements axially relatively to one another, and means grippingly engageable with said stem and selectively movable into and out of locking engagement with said tubular member.

2. An expanding centering holder for centering the stem of a bore concentricity gauge in a reference bore while checking the concentricity of a related bore, comprising a tubular member having a central passageway snugly but slidably and rotatably receiving the gauge stem, a bore-contacting-element support disposed outwardly of said tubular member and having two axially-spaced sets of multiple outwardly-directed bore-contacting-element guideways disposed in circumferentially-spaced relationship therein, multiple bore-contacting elements mounted in said guideways for motion outwardly from said tubular member, a pair of axially-spaced oppositely-tapered bore-contacting-element expanders mounted between said tubular member and said elements, one of said expanders being attached to said tubular member and the other expander being axially slidably mounted thereon, means for moving said slidable expander axially relatively to said attached expander, and means grippingly engageable with said stem and selectively movable into and out of locking engagement with said tubular member.

3. An expanding centering holder for centering the stem of a bore concentricity gauge in a reference bore while checking the concentricity of a related bore, comprising a tubular member having a central passageway snugly but slidably and rotatably receiving the gauge stem, a bore-contacting-element support disposed outwardly of said tubular member and having two axially-spaced sets of multiple outwardly-directed bore-contacting-element guideways disposed in circumferentially-spaced relationship therein, multiple bore-contacting elements mounted in said guideways for motion outwardly from said tubular member, a pair of axially-spaced oppositely-tapered bore-contacting-element expanders mounted between said tubular member and said elements, one of said expanders being attached to said tubular member and the other expander being axially slidably mounted thereon, means for moving said slidable expander axially relatively to said attached expander, and a locking device grippingly engageable with said stem and selectively movable into and out of locking engagement with said tubular member.

References Cited in the file of this patent

UNITED STATES PATENTS

| | | |
|---|---|---|
| 1,329,456 | Carpenter | Feb. 3, 1920 |
| 1,438,316 | Krejci | Dec. 12, 1922 |
| 1,618,037 | Wright | Feb. 15, 1927 |
| 2,499,781 | Rothenberger | Mar. 7, 1950 |
| 2,692,439 | Wilson | Oct. 26, 1954 |

FOREIGN PATENTS

| | | |
|---|---|---|
| 138,903 | Sweden | Jan. 27, 1953 |